United States Patent
Yamine et al.

(10) Patent No.: US 9,585,160 B2
(45) Date of Patent: Feb. 28, 2017

(54) PRIORITIZING LOCATION REQUEST OF A CERTAIN TYPE IN A CONGESTION SITUATION

(71) Applicant: Telefonaktiebolaget L M Ericsson (publ), Stockholm (SE)

(72) Inventors: Badawi Yamine, Beirut (LB); Iana Siomina, Solna (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 112 days.

(21) Appl. No.: 14/556,643

(22) Filed: Dec. 1, 2014

(65) Prior Publication Data

US 2016/0157253 A1 Jun. 2, 2016

(51) Int. Cl.
| | | |
|---|---|---|
| H04W 24/00 | (2009.01) | |
| H04W 72/10 | (2009.01) | |
| H04W 76/04 | (2009.01) | |
| H04W 28/02 | (2009.01) | |
| H04L 12/851 | (2013.01) | |

(52) U.S. Cl.
CPC ........... *H04W 72/10* (2013.01); *H04W 28/02* (2013.01); *H04W 76/046* (2013.01); *H04L 47/24* (2013.01)

(58) Field of Classification Search
USPC ........... 455/456.2, 458, 435.1; 370/235, 328
See application file for complete search history.

(56) References Cited

U.S. PATENT DOCUMENTS

| | | | |
|---|---|---|---|
| 2011/0004690 A1 | 1/2011 | Georgel et al. | |
| 2012/0002545 A1* | 1/2012 | Watfa ................... | H04W 48/06 370/235 |

(Continued)

FOREIGN PATENT DOCUMENTS

| | | |
|---|---|---|
| EP | 1523142 A1 | 4/2005 |
| EP | 2779544 A1 | 9/2014 |
| WO | 2009118023 A1 | 10/2009 |

OTHER PUBLICATIONS

Invitation to Pay Additional Fees and Partial International Search for International Patent Application No. PCT/IB2015/055601, mailed Oct. 9, 2015, 5 pages.

(Continued)

*Primary Examiner* — David Q Nguyen
(74) *Attorney, Agent, or Firm* — Withrow & Terranova, PLLC

(57) ABSTRACT

Systems and methods related to prioritization of location requests in a cellular communications system are disclosed. Embodiments including a method of operation of a network node in a cellular communications system to process a message related to a location request are disclosed. In some embodiments, the method of operation of the network node comprises receiving a message related to a location request and performing congestion control with respect to the message related to the location request, either prior to or during setup of a radio connection between a Radio Access Network (RAN) of the cellular communications network and a target wireless device of the location request, based on a priority assigned to the location request. In this manner, the location request can be allowed even if the target wireless device is located in a congested cell.

21 Claims, 12 Drawing Sheets

(56) References Cited

U.S. PATENT DOCUMENTS

| | | | | |
|---|---|---|---|---|
| 2012/0270574 A1* | 10/2012 | Nishida | ............... | H04W 68/02 455/458 |
| 2012/0315903 A1* | 12/2012 | Yoshimura | ............ | H04W 60/04 455/435.1 |
| 2013/0034060 A1* | 2/2013 | Lu | .................... | H04W 36/0022 370/328 |
| 2013/0143515 A1* | 6/2013 | Zhu | ..................... | H04W 76/007 455/404.1 |
| 2013/0329559 A1* | 12/2013 | Cabrera | ............ | H04W 28/0289 370/235 |
| 2015/0131437 A1* | 5/2015 | Kim | .................. | H04W 28/0289 370/230 |

OTHER PUBLICATIONS

Author Unknown, "3rd Generation Partnership Project; Technical Specification Group Services and System Aspects; Location Services (LCS); Service description; Stage 1 (Release 11)," Technical Specification 22.071, Version 11.0.0, Sep. 2012, 3GPP Organizational Partners, 51 pages.

Author Unknown, "3rd Generation Partnership Project; Technical Specification Group Services and System Aspects; Location Services (LCS); Service description; Stage 1 (Release 12)," Technical Specification 22.071, Version 12.0.0, Oct. 2014, 3GPP Organizational Partners, 52 pages.

Author Unknown, "3rd Generation Partnership Project; Technical Specification Group Services and System Aspects; Functional stage 2 description of Location Services (LCS) (Release 11)," Technical Specification 23.271, Version 11.3.0, Jun. 2014, 3GPP Organizational Partners, 169 pages.

Author Unknown, "3rd Generation Partnership Project; Technical Specification Group Services and System Aspects; Functional stage 2 description of Location Services (LCS) (Release 12)," Technical Specification 23.271, Version 12.1.0, Jun. 2014, 3GPP Organizational Partners, 169 pages.

Author Unknown, "3rd Generation Partnership Project; Technical Specification Group Radio Access Network; Radio Resource Control (RRC); Protocol specification (Release 11)," Technical Specification 25.331, Version 11.10.0, Jun. 2014, 3GPP Organizational Partners, 2100 pages.

Author Unknown, "3rd Generation Partnership Project; Technical Specification Group Radio Access Network; UTRAN Iu interface Radio Access Network Application Part (RANAP) signalling (Release 11)," Technical Specification 25.413, Version 11.6.0, Mar. 2014, 3GPP Organizational Partners, 443 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.9.0, Sep. 2014, 3GPP Organizational Partners, 356 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 12)," Technical Specification 36.331, Version 12.3.0, Sep. 2014, 3GPP Organizational Partners, 378 pages.

Author Unknown, "3rd Generation Partnership Project; Technical Specification Group Radio Access Network; Evolved Universal Terrestrial Radio Access Network (E-UTRAN); S1 Application Protocol (S1AP) (Release 11)," Technical Specification 36.413, Version 11.8.0, Sep. 2014, 3GPP Organizational Partners, 274 pages.

Author Unknown, "3rd Generation Partnership Project; Technical Specification Group Radio Access Network; Evolved Universal Terrestrial Radio Access Network (E-UTRAN); S1 Application Protocol (S1AP) (Release 12)," Technical Specification 36.413, Version 12.3.0, Sep. 2014, 3GPP Organizational Partners, 290 pages.

* cited by examiner

PRIORITIZING LOCATION REQUEST OF A CERTAIN TYPE IN A CONGESTION SITUATION

FIELD OF THE DISCLOSURE

The present disclosure relates to location requests in a cellular communications network and, in particular, to the prioritization of location requests in a cellular communications network.

BACKGROUND

Many wireless networks provide location services that provide the capability to locate a target wireless device(s). These location services may be utilized internally by the network and may support requests from third-party clients. The third-party clients may be, for example, clients that offer non-emergency services (e.g., social networking services) or clients that offer emergency services (e.g., police services). Currently, in $3^{rd}$ Generation Partnership Project (3GPP) Long Term Evolution (LTE), support for Location Services (LCS) is defined in 3GPP Technical Specification (TS) 22.071 version 12.0.0 Release 12. According to 3GPP TS 22.071, location requests for different services may be processed with different priorities. In particular, a location request with a higher priority may be accorded faster access to resources than one with a lower priority and may receive a faster, more reliable and/or more accurate location estimate. However, there are situations where even high priority location requests (e.g., location requests for emergency services) will fail. As such, there is a need for systems and methods that mitigate the risk of the failure of, in particular, a high priority location request.

SUMMARY

Systems and methods related to prioritization of location requests in a cellular communications system are disclosed. Embodiments including a method of operation of a network node in a cellular communications system to process a message related to a location request are disclosed. In some embodiments, the method of operation of the network node comprises receiving a message related to a location request and performing congestion control with respect to the message related to the location request, either prior to or during setup of a radio connection between a Radio Access Network (RAN) of the cellular communications network and a target wireless device of the location request, based on a priority assigned to the location request. In this manner, the location request can be allowed even if the target wireless device is located in a congested cell.

In some embodiments, the network node is a radio access node in the RAN, and the message is a paging request related to the location request. Further, in some embodiments, the paging request comprises an indication of the priority assigned to the location request. Still further, in some embodiments, the paging request is a S1 Application Protocol (S1AP) paging request, and the indication of the priority assigned to the location request is comprised in a Paging Priority Information Element (IE) of the S1AP paging request. In some embodiments, performing congestion control comprises performing congestion control with respect to the paging request based on the indication of the priority assigned to the location request comprised in the paging request.

In some embodiments, the network node is a radio access node in the RAN, and the message is a connection request from the target wireless device of the location request. Further, in some embodiments, the connection request comprises an indication of the priority assigned to the location request. Still further, in some embodiments, the connection request is a Radio Resource Control (RRC) Connection Request, and the indication of the priority assigned to the location request is provided by an Establishment Cause comprised in the RRC Connection Request. Still further, in some embodiments, the Establishment Cause is set to a value that is indicative of a high priority location request if the priority assigned to the location request is a high priority. In some embodiments, performing congestion control comprises performing congestion control with respect to the connection request based on the indication of the priority assigned to the location request comprised in the connection request.

In some embodiments, the method further comprises, prior to receiving the connection request, sending a paging request to the target wireless device including an indication of the priority assigned to the location request. Further, in some embodiments, the paging request is an RRC paging request, and the indication of the priority assigned to the location request is comprised in an IE in the RRC paging request that is dedicated to providing an indication of location request priority. Still further, in some embodiments, the connection request is an RRC Connection Request, and the RRC Connection Request comprises an Establishment Cause set to an indication of a high priority location request if the indication of the priority assigned to the location request comprised in the IE in the RRC paging request is indicative of the location request being a high priority location request.

In some embodiments, the network node is a core network node in a core network of the cellular communications network, and the message is a location request reporting control message. Further, in some embodiments, the location request reporting control message comprises an indication of the priority assigned to the location request.

In some embodiments, performing congestion control with respect to the message related to the location request comprises determining whether the network node is congested; if the network node is congested, determining whether the location request is a high priority location request; and, if the location request is a high priority location request, taking an action to enable acceptance of the location request.

In some embodiments, the method of operation of the network node further comprises receiving an indication of the priority assigned to the location request from another network node.

In some embodiments, the method of operation of the network node further comprises determining the priority assigned to the location request.

In some embodiments, the method of operation of the network node further comprises obtaining information related to the priority assigned to the location request, and setting the priority assigned to the location requested based on the information. Further, in some embodiments, the information related to the priority assigned to the location request comprises a source of the location request, one or more targets of the location request, and/or a cause of the location request. In some embodiments, setting the priority comprises dynamically setting the priority assigned to the location request based on the information and one or more predefined rules.

Embodiments of a network node in a cellular communications system enabled to process a message related to a location request are also disclosed. In some embodiments, the network node comprises an interface, at least one processor, and memory containing software executable by the at least one processor whereby the network node is configured to receive a message related to a location request via the interface and perform congestion control with respect to the message related to the location request, either prior to or during setup of a radio connection between a RAN of the cellular communications network and a target wireless device of the location request, based on a priority assigned to the location request.

Embodiments of a method of operation of a network node to enable prioritization of a location request in a cellular communications network are also disclosed. In some embodiments, the method of operation of the network node comprises obtaining information related to a priority of a location request, setting the priority of the location request based on the information, and providing an indication of the priority of the location request to another network node prior to or during connection setup between a RAN and a target wireless device of the location request with respect to the location request.

In some embodiments, providing the indication of the priority of the location request to another network node comprises providing the indication of the priority of the location request to a core network node prior to connection setup between the RAN and the target wireless device of the location request with respect to the location request. Further, in some embodiments, providing the indication of the priority of the location request to the core network node comprises providing the indication of the priority of the location request to the core network node as part of a Provide Subscriber Location message.

In some embodiments, the network node is a core network node, and providing the indication of the priority of the location request to another network node comprises providing the indication of the priority of the location request from the core network node to a radio access node prior to connection setup between the RAN and the target wireless device of the location request with respect to the location request. Further, in some embodiments, providing the indication of the priority of the location request from the core network node to the radio access node comprises providing the indication of the priority of the location request from the core network node to the radio access node as part of an S1AP paging request.

In some embodiments, the network node is a radio access node, and providing the indication of the priority of the location request to another network node comprises providing the indication of the priority of the location request from the radio access node to the target wireless device of the location request prior to connection setup between the RAN and the target wireless device of the location request with respect to the location request. Further, in some embodiments, providing the indication of the priority of the location request from the radio access node to the target wireless device comprises providing the indication of the priority of the location request from the radio access node to the target wireless device as part of a paging request.

Embodiments of a network node in a cellular communications system enabled to process a message related to a location request are also disclosed. In some embodiments, the network node comprises an interface, at least one processor, and memory containing software executable by the at least one processor whereby the network node is configured to obtain information related to a priority of a location request, set the priority of the location request based on the information, and provide an indication of the priority of the location request to another network node prior to or during connection setup between a RAN and a target wireless device of the location request with respect to the location request.

Embodiments of a method of operation of a wireless device that is a target of a location request in a cellular communications network are also disclosed. In some embodiments, the method of operation of the wireless device comprises sending a connection request to a RAN of the cellular communications network comprising an indication that the connection request is related to a high priority location request, and, in response, receiving a connection setup message from the RAN.

In some embodiments, sending the connection request comprises sending the connection request with an Establishment Cause set to indicate that a cause of the connection request is a high priority location request.

In some embodiments, the method of operation of the wireless device further comprises, prior to sending the connection request, receiving a paging request from the RAN including an indication that the paging request is related to a high priority location request. Further, in some embodiments, sending the connection request comprises sending the connection request comprising the indication that the connection request is related to a high priority location request in response to receiving the paging request including the indication that the paging request is related to a high priority location request.

Embodiments of a wireless device that is a target of a location request in a cellular communications network are also disclosed. In some embodiments, the wireless device comprises a wireless transceiver, at least one processor, and memory containing software executable by the at least one processor whereby the wireless device is operative to: send, via the wireless transceiver, a connection request to a RAN of the cellular communications network comprising an indication that the connection request is related to a high priority location request and, in response, receive, via the wireless transceiver, a connection setup message from the RAN.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to enabling location requests of certain types (e.g., high priority location requests) in congested cells of a cellular communications network. As discussed below, using current technology, prioritization of location requests is triggered after establishment of the signaling channel over the air interface between the Radio Access Network (RAN) and the targeted wireless device. As a result, if there is congestion in the RAN, then the location request will fail even if the location request is for a high priority service (e.g., an emergency service). In order to address this issue, systems and methods are disclosed herein that enable prioritization of a location request prior to or during establishment of the signaling channel over the air interface such that the priority of the location request can be taken into account when performing congestion control. As a result, actions can be taken to allow high priority location requests even in a congested cell.

Figure 1:
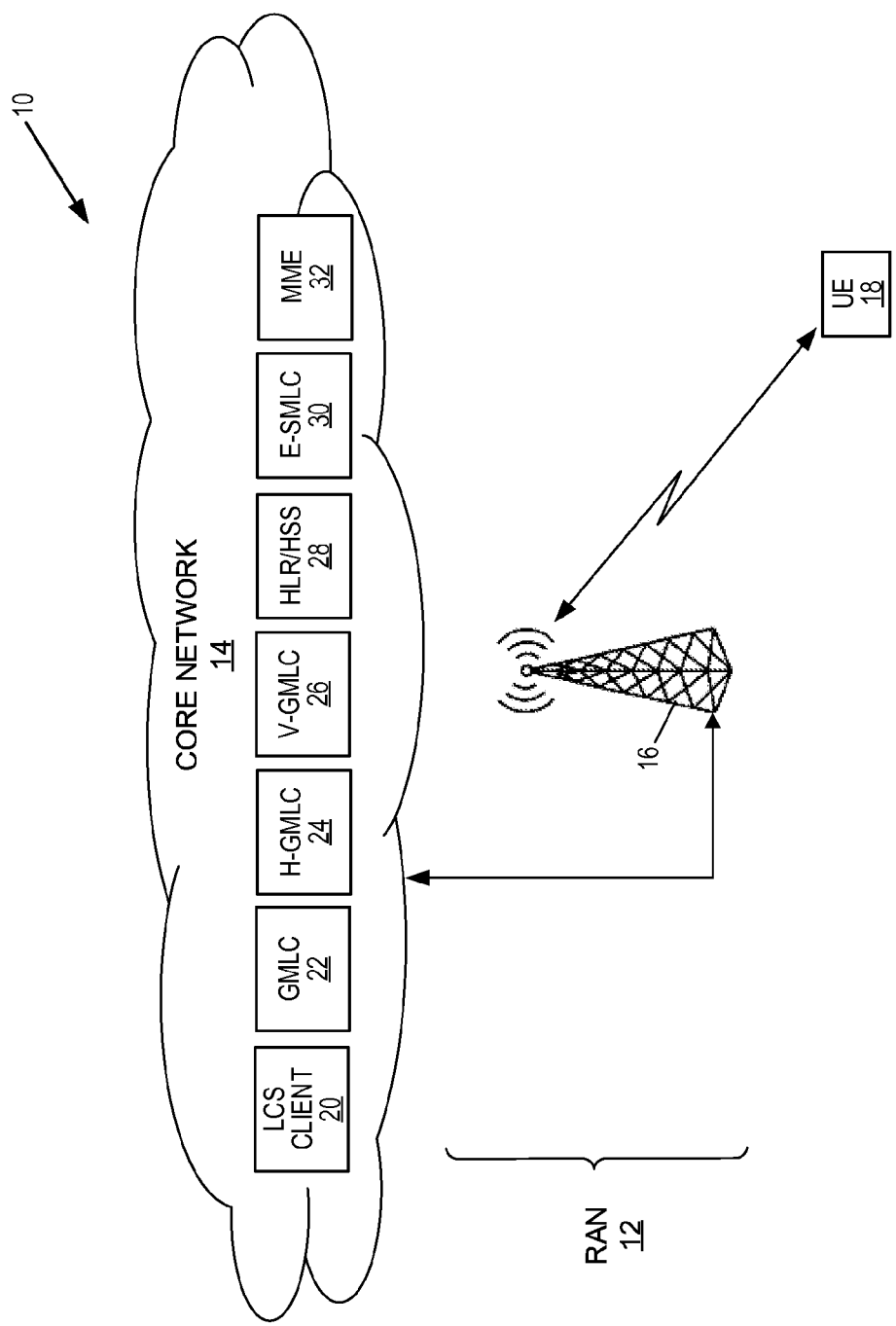
FIG. 1 illustrates a cellular communications system according to some embodiments of the present disclosure.

In this regard, FIG. 1 illustrates a cellular communications system 10 including a RAN 12 and a core network 14 according to some embodiments of the present disclosure. The discussion here focuses on embodiments in which the cellular communications system 10 is a $3^{rd}$ Generation Partnership Project (3GPP) Long Term Evolution (LTE) cellular communications system, where the RAN 12 is an Evolved Universal Terrestrial RAN (E-UTRAN) and the core network 14 is an Evolved Packet Core (EPC) and the E-UTRAN and the EPC together form an Evolved Packet System (EPS). As such, 3GPP LTE terminology is oftentimes used in this disclosure. However, the concepts disclosed herein are not limited to 3GPP LTE and may be used in any suitable type of wireless communications system (e.g., Universal Mobile Telecommunications System (UMTS) or future $5^{th}$ Generation (5G) systems). Therefore, more general terminology is sometimes used. Notably, as used herein, a "network node" is any node in either the RAN 12 or the core network 14, a "core network node" is any node in the core network 14, a "radio access node" is any node in the RAN 12, a node in the cellular communications system 10 is any network node or a wireless device, and a "wireless device" is any mobile or stationary device or terminal that accesses the cellular communications system 10 via the RAN 12 (e.g., a User Equipment (UE)).

As illustrated, the RAN 12 includes a base station 16 (e.g., an enhanced or evolved Node B (eNB)). While only one base station 16 is illustrated for simplicity and ease of discussion, the RAN 12 may include any number of base stations 16 and, in some implementations, other types of radio access nodes (e.g., Remote Radio Heads (RRHs). Notably, different types of cellular communications systems 10 may include different types of radio access nodes (e.g., eNBs for LTE versus Radio Network Controllers (RNCs) and Node Bs (NBs) for UMTS). The base station 16 provides radio access, or wireless services, to wireless devices, such as wireless device 18, located within the coverage area (e.g., cell) of the base station 16. The wireless device 18 may be any type of mobile or stationary device enabled to communicate with the RAN 12. In 3GPP LTE terminology, the wireless device 18 may be referred to as a UE. With respect to location services, the wireless device 18 is preferably mobile, but is not limited thereto.

The core network 14 includes various core network nodes. In this example, the core network 14 includes a Location Services (LCS) client 20, a Gateway Mobile Location Center (GMLC) 22, a Home GMLC (H-GMLC) 24, a Visiting GMLC (V-GMLC) 26, a Home Location Register/Home Subscriber Server (HLR/HSS) 28, an Enhanced Serving Mobile Location Center (E-SMLC) 30, and a Mobility Management Entity (MME) 32. The LCS client 20 is a software and/or hardware entity that interacts with an LCS server to obtain location information for LCS targets (e.g., the UE 18). The LCS client 20 subscribes to the LCS in order to obtain location information. Notably, the LCS client 20 is illustrated as being part of the core network 14, but is not limited thereto. For example, the LCS client 20 may reside in a wireless device 18 (e.g., to obtain the location of another wireless device 18). The LCS server is a software and/or hardware entity offering LCS capabilities. The LCS server accepts requests, services requests, and sends back responses to the received requests. The LCS server includes LCS components, which can be distributed to one or more PLMNs and/or service providers.

The GMLC 22 is the first node that the external LCS client 20 accesses in the core network 14. The GMLC 22 supports routing of location requests and responses. The GMLC 22 is more specifically referred to herein as the requesting GMLC 22, which is the GMLC 22 that receives a location request from the LCS client 20. In contrast, with respect to the location request received by the GMLC 22, the H-GMLC 24 is the GMLC residing in the target UEs (i.e., the target of the location request which in the illustrated example is the UE 18) home Public Land Mobile Network (PLMN). The H-GMLC 24 is responsible for the control of privacy checking of the target UE 18. The V-GMLC 26 is the GMLC that is associated with the serving node of the target UE 18. From the GMLC perspective, the serving node of the target UE 18 is the MME 32. Note, however, that from the UE perspective, the serving node is the eNB 16.

The HLR/HSS 28 includes an HLR and/or an HSS. An HLR is the main database for user data in Global System for Mobile Communications (GSM) and Wideband Code Division Multiple Access (WCDMA). In contrast, an HSS is the master database for user data in LTE. The HSS is also contains subscription-related information to support network entities handling mobility and user Internet Protocol (IP) sessions.

The E-SMLC 30 supports the LCS function and coordinates positioning of, in this example, the UE 18. The E-SMLC 30 calculates the final location and velocity estimate and estimates the accuracy of the location and velocity estimates.

The MME 32 is connected to the eNB 16 via the S1-MME interface. The MME 32 handles LTE-related control plane signaling, including mobility and security functions for devices and terminals (e.g., the UE 18) attached over the RAN 12. The MME 32 also manages all terminals that are in IDLE mode, including support for Tracking Area management and paging.

Figure 2:
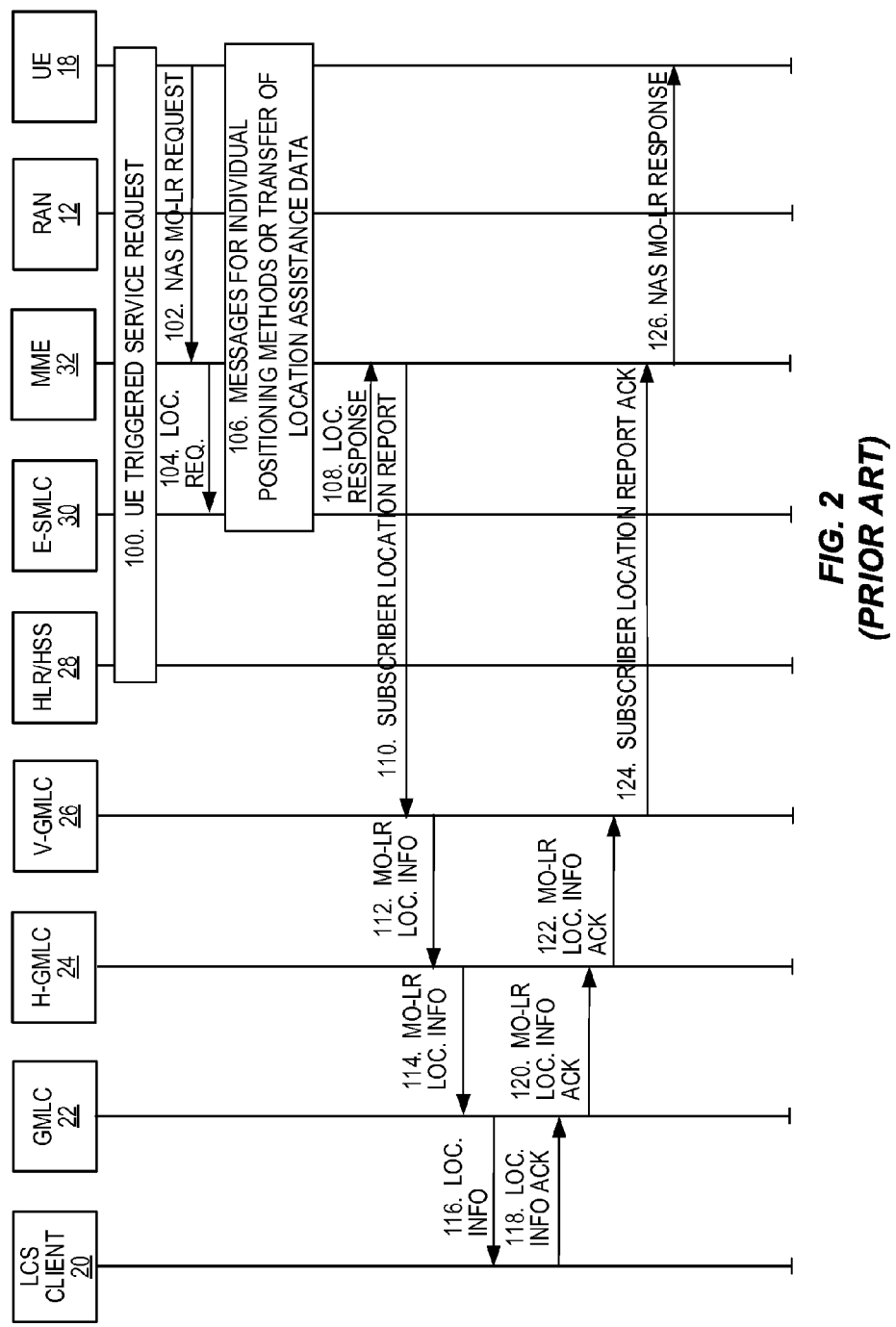
FIG. 2 illustrates a conventional Mobile Originating Location Request (MO-LR) procedure.
Figure 3:
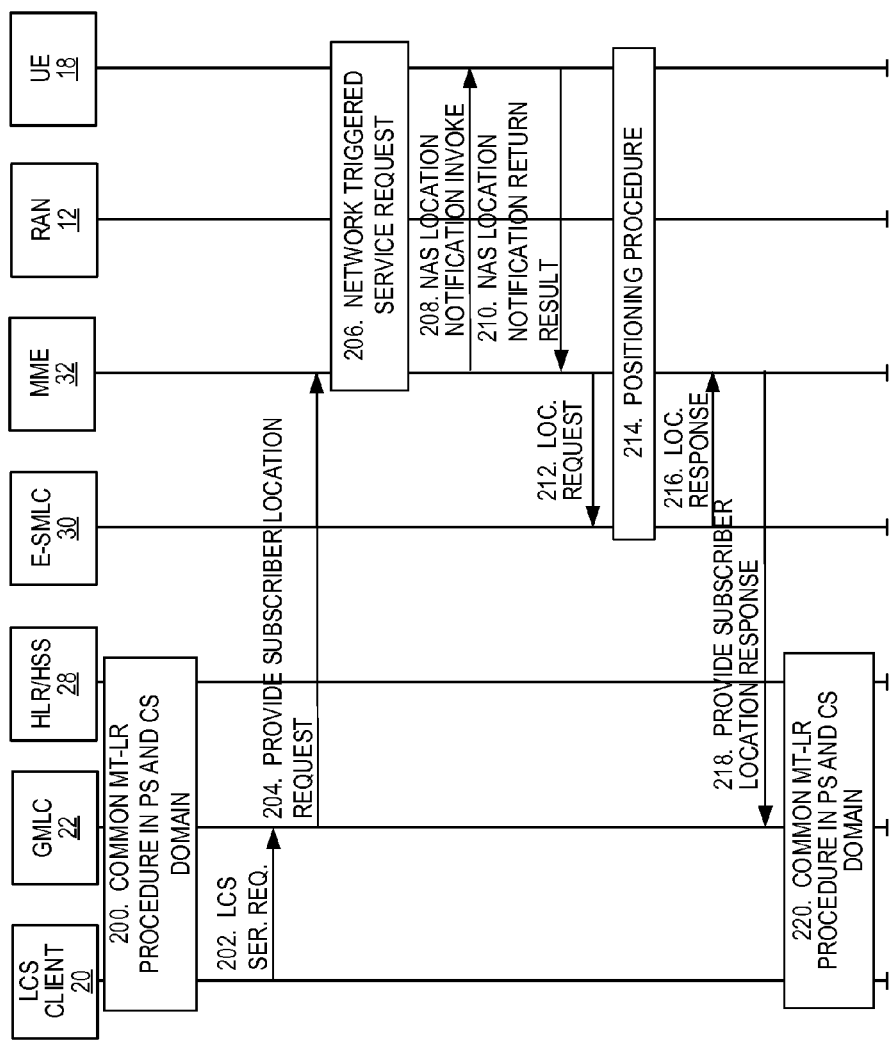
FIG. 3 illustrates a conventional Mobile Terminating Location Request (MT-LR) procedure.

Currently, 3GGP Technical Specification (TS) 23.271 Release 12; V12.1.0 defines a Mobile Originating Location Request (MO-LR) and a Mobile Terminating LR (MT-LR) as illustrated in FIGS. 2 and 3, respectively. As illustrated in FIG. 2, for a MO-LR, a service request is first triggered by the UE 18 (step 100). Among other things, during step 100, an RRC connection is setup between the RAN 12 and the UE 18. In particular, an RRC connection is setup between the base station 16 and the UE 18. The UE 18 then sends a Non-Access Stratum (NAS) MO-LR request to the MME 32 via the RAN 12 (step 102), and the MME 32 then forwards the location request to the E-SMLC 30 (step 104). In response to the location request, messages are exchanged for individual positioning methods or transfer of location assistance data depending on the particular implementation (step 106). At that point, the location of the UE 18 is known to the E-SMLC 30. The E-SMLC 30 then sends a location response to the MME 32 containing the location of the UE 18 (step 108). The MME 32 then sends a subscriber location report including the location of the UE 18 to the V-GMLC 26 (step 110). The V-GMLC 26 then sends MO-LR location information including the location of the UE 18 to the H-GMLC 24 (step 112), and the H-GMLC 24 then sends the MO-LR location information to the GMLC 22 (step 114). The GMLC 22 then sends the location information to the appropriate LCS client 20 (step 116). Acknowledgments are then sent to the appropriate nodes (steps 118-124). Lastly, a NAS MO-LR response is provided from the MME 32 to the UE 18 via the RAN 12 (step 126). At that point, the MO-LR procedure is complete.

The MT-LR procedure is similar to the MO-LR procedure. In particular, as illustrated in FIG. 3, the LCS client 20 initiates the MT-LR procedure via a common MT-LR procedure in the Packet Switched (PS) and Circuit Switched (CS) domain (step 200). The LCS client 20 then sends an LCS Service Request to the GMLC 22 (step 202), and the GMLC 22 sends a Provide Subscriber Location Request to the MME 32 (step 204). Notably, the Provide Subscriber Location Request is sometimes simply referred to as a Provide Subscriber Location message. In response, the MME 32 triggers a service request to the UE 18 (step 206). In particular, if the UE 18 is in the IDLE mode, the MME 32 sends a paging request to the RAN 12, which in turn sends a paging request to the UE 18. In response, the UE 18 initiates a connection setup with the RAN 12. Thereafter, the MME 32 sends a NAS location notification invoke message to the UE 18 via the RAN 12 (step 208). In response, the UE 18 sends a NAS location notification return result message to the MME 32 via the RAN 12 (step 210). As described in 3GPP TS 23.271 Release 12; V12.1.0, the location notification invoke message is sent to the target UE 18 indicating the type of location request from the LCS client 20 (e.g., current location or current or last known location). The location notification invoke message may also include the identity of the LCS client 20 (the requestor identity) and whether privacy verification is required. Note, however, that for emergency and lawful intercept, there is no notification invoke. For normal services, there are the following options: positioning allowed without notifying the UE user, positioning allowed with notification to the UE user, and positioning allowed only with notification and verification by the UE user.

The MME 32 then sends a location request to the E-SMLC 30 for the location of the target, which in this example is the UE 18 (step 212). A positioning procedure is then performed to thereby determine or otherwise obtain the location of the UE 18 (step 214). The E-SMLC 30 then sends a location response to the MME 32 containing the location of the UE 18 (step 216). The MME 32 then sends a provide subscriber location response message (sometimes referred to as a subscriber location ACK message) to the GMLC 22 (step 218). A common MT-LR procedure in the PS and CS domain is then utilized to provide the location of the UE 18 to the LCS client 20 (step 220). At that point, the MT-LR procedure is complete.

Oftentimes it is desirable to assign priorities to location requests. For example, a location request from an emergency service (e.g., the police) should be given a higher priority than a location request from a non-emergency service (e.g., a social networking service). Accordingly, as defined in 3GPP TS 22.071 Release 12, V12.0.0, location requests for different services may be processed with different priorities. However, in current standards, that location prioritization functionality is triggered after establishment of the signaling channel on air interface. In other words, the priority for special types of location requests is sent to the target UE 18 after setup of the connection between the UE 18 and the RAN 12 (i.e., after Radio Resource Control (RRC) protocol message signaling exchange). For example, in UMTS Terrestrial Radio Access (UTRA), the Positioning Priority Information Element (IE) might be included in the RAN Application Part (RANAP) (3GPP TS 25.413) Location Reporting Control message, which is sent to the UE 18 after RRC connection setup. Note that, in LTE, the actual S1 Application Protocol (S1AP) (3GPP TS 36.413 Release 12; V12.3.0) Location Reporting Control does not contain a Positioning Priority IE as is the case with a UMTS RANAP message.

Whether it is in UMTS or in an LTE system, a problem arises if there is congestion in the cell of the target UE 18. This congestion in the cell would translate to congestion at the RRC level. In such situation, the base station 16 (specifically the RNC in UMTS or the eNB in LTE) may reject any incoming RRC Connection Requests. At this stage, in the current standards, there is no location request priority at the RRC level. As mentioned above, in the current standards, location priority is performed at later stages of the location procedure (i.e., after RRC establishment). That means that a location request coming from an emergency center, from police, or from a normal subscriber would all be treated with the same RRC priority; hence, for all of them, the location procedure would fail in the case of congestion. As an example, if the police or a normal subscriber were tracking the UE 18 when in IDLE mode and the UE 18 moves to an area where the cell is congested, then that tracking will fail. The same failure would occur if the UE 18 was located in a congested cell when the first location trigger was issued.

Systems and methods are disclosed herein for location request prioritization prior to or at the RRC level (e.g., prior to or during connection setup/establishment between the target UE 18 and the RAN 12). By doing so, in some embodiments, the priority of the location request can be considered when performing congestion control (e.g., at the RRC level). In this regard, actions may be taken to allow location requests of certain types (e.g., high priority location requests) even when there is congestion (e.g., even when congestion control would have normally caused the location requests to fail).

In some embodiments, the rejection of RRC connection setup is avoided by addition of a priority indication at the RRC level for a certain type of location requests (e.g., location requests triggered by the police or some other emergency service). In such a scenario, that type of location requests could, e.g., be treated with a similar priority as an emergency call, although in other scenarios the same location request type may not need to be prioritized over some or all traffic. In this example, as a result of the priority indication at the RRC level, whenever a location request with a high priority indication is originated from, e.g., the police for a target UE in a congested cell, a network node may perform congestion control while giving a higher priority to this location request, which may result, e.g., in releasing a normal call from this or other UE and reallocating its resources to this request instead.

In some embodiments, location requests of a certain type(s) are prioritized to cope with a congestion situation at either the interface between the base station 16 and the core network 14 (e.g., the S1 interface) or the interface between the base station 16 and the target UE 18 (e.g., the RRC interface). In particular, location requests of a certain type(s) are identified as being high priority location requests. High priority location requests may be, e.g., location requests for a certain purpose (e.g., for lawful intercept), location requests from a certain entity (e.g., from the police), location requests targeting a certain one or more (e.g., a group) of UEs 18, etc. The high priority location requests may be for single location reporting or for multiple location reportings (e.g., UE tracking or periodic location reporting for the UE 18). The prioritization of the high priority location requests may be over other location requests and, in some embodiments, over other messaging which may (in some embodiments) or may not be necessarily (in other embodiments) related to location.

The priority of location requests may be configured statically, semi-statically, or dynamically depending on the particular embodiment. For instance, in some embodiments, the priorities may be configured dynamically and assigned according to network load conditions and/or criticality of certain requests. The criticality of certain requests may be computed during operation depending on other types of information, e.g., obtained by measurements or other techniques. In some embodiments, the adaptation may be performed in a node controlling the priority and/or a node performing congestion control (e.g., the base station 16). In further embodiments, this node may also be informed about this priority by another node (e.g., an MME or a positioning node). Dynamic or semi-dynamic control of the priority of location requests has an advantage of being adaptive to situations when, e.g., location requests of a certain type may have different importance at different times.

In order to allow prioritization of location requests, different prioritization procedures can be implemented at the interfaces of the base station 16, which for LTE are the S1 and RRC interfaces. With regard to the S1 interface (i.e., the interface between the RAN 12 and the core network 14), in some embodiments, an indication of a priority is included in a message (e.g., broadcast, multicast, or unicast message) transmitted from a core network node (i.e., a node in the core network 14 such as, e.g., the MME 32) to the RAN 12 (e.g., to the base station 16) to thereby indicate a priority of an associated, or related, location request. The priority may be a relative priority or an absolute priority. For example, the priority may indicate that the associated location request has a higher priority than some other type of messaging or indicate that the location request has some absolute priority (e.g., a highest or sufficiently high priority). The association to the location request may be in different ways, e.g., the indication may be included in the location request, the indication may be associated with the location request based on a predefined rule, or the indication may be transmitted in another message in an associated time (e.g., transmitted T1 time before the location request).

More specifically, in some embodiments, if the target UE 18 of the location request is in CONNECTED mode, the indication of the priority of the location request may be included in a new IE field (referred to herein as "Positioning Priority") added to the S1AP Location Reporting Control message transmitted from, e.g., the MME 32 to the base station 16. The base station 16 is then aware of the priority of the location request and can take any appropriate action(s). As an example, if the base station 16 is congested, the base station 16 might reject any new incoming normal S1AP messages (even though they are related to the already connected UE), but the base station 16 may allow some high priority S1AP messages like an S1AP Location Reporting Control message with a high Positioning Priority. Otherwise a congested base station 16 might reject an S1AP Location Reporting Control message with a normal priority. As another example, in UMTS, if a subscriber is connected with a speech call and if the cell is congested, then the RNC might reject any new service like a new internet connection (PS call) from the same subscriber as this requires additional resources on air interface and additional processing and signaling. However, the RNC might allow a high priority location reporting control message.

Figure 4:
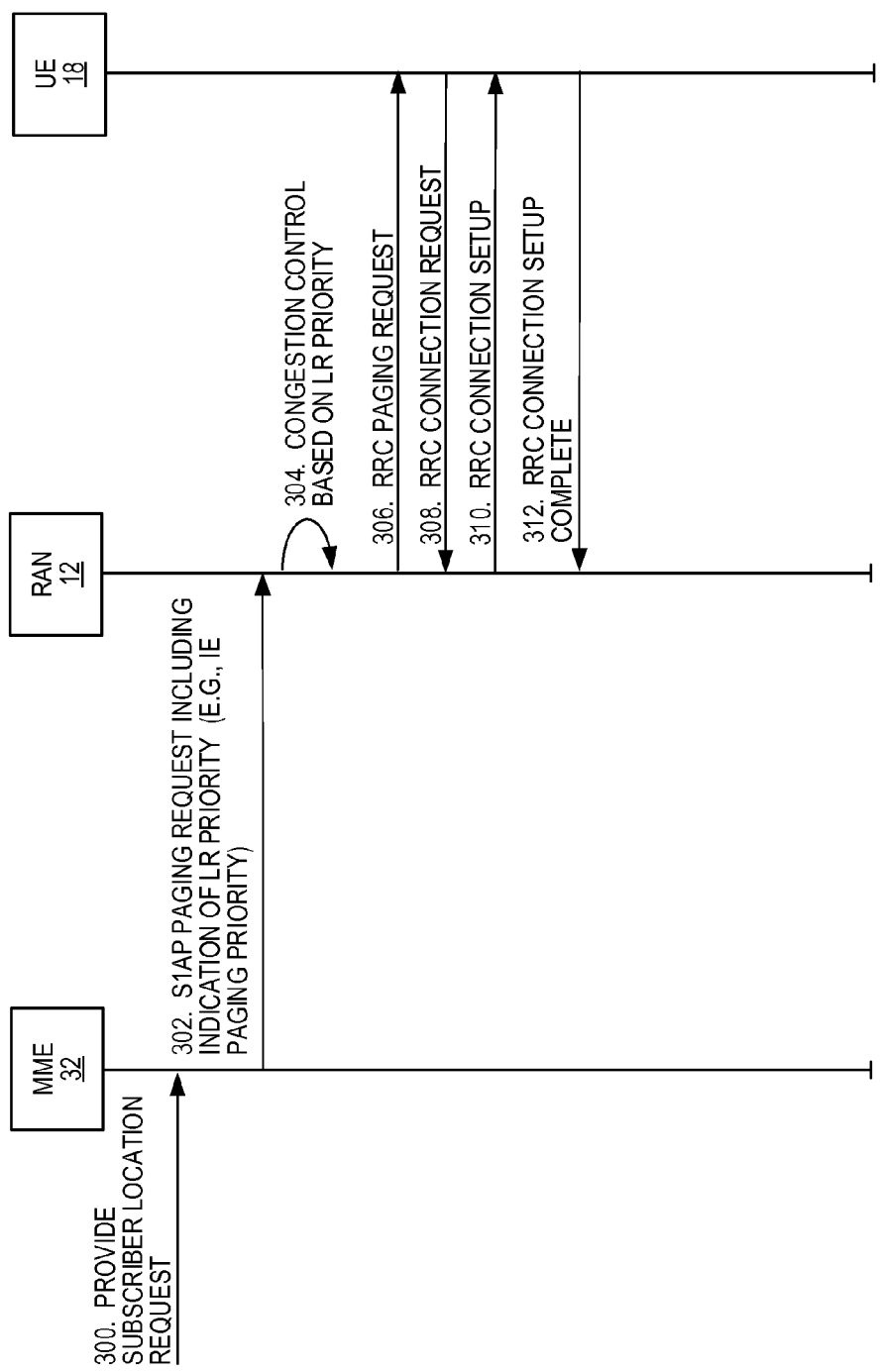
FIG. 4 illustrates the operation of the cellular communications system of FIG. 1 in which an indication of the priority of a MT-LR is utilized for congestion control by the Radio Access Network (RAN) according to some embodiments of the present disclosure.

In other embodiments, the indication of the priority of the location request is included in a paging request/message transmitted from a core network node (e.g., the MME 32) to the RAN 12 (e.g., to the base station 16) for the target UE 18 of the location request. In this regard, FIG. 4 illustrates the operation of the cellular communications system 10 of FIG. 1 in which an indication of the priority of a location request is included in a paging request from the MME 32 to the RAN 12 according to some embodiments of the present disclosure. In this embodiment, the location request is a MT-LR, and the UE 18 is in the IDLE mode. As illustrated, the MME 32 receives a Provide Subscriber Location message (step 300). This step corresponds to step 204 in the MT-LR procedure of FIG. 3. The MME 32 then sends an S1AP Paging Request including an indication of the priority of an associated location request to the RAN 12 (specifically to the base station 16) (step 302). The indication of the priority of the associated location request may be a general purpose priority indication or a position-specific (e.g., location request specific) priority indication. However, in either case, there is an association between the location request and the indication of priority.

In some embodiments, the priority of the location request is set by another network node (e.g., the GMLC 22). For example, in some embodiments, the GMLC 22 sets the priority of the location request based on one or more parameters such as, for example, the source of the location request (e.g., an emergency service or a non-emergency service), a cause of the location request, and/or the target UE(s) 18 of the location request. In addition, one or more predefined rules may be further considered when setting the priority of the location request (e.g., a rule based on time of day, a rule based on network load conditions, etc.). Once the priority is set, in some embodiments, an indication of the priority of the location request is provided to the MME 32. For example, the indication of the priority of the location request may be provided to the MME 32 in the Provide Subscriber Location message. In this case, the indication of the priority of the location request may be implemented as, for example, a flag in the Provide Subscriber Location message (e.g., the flag is set to one value to indicate high priority or a different value to indicate a normal priority). The priority indication received by the MME 32 is then translated, by the MME 32, into the indication of the priority of the location request included in the S1AP Paging Request.

In other embodiments, the priority of the location request is set or otherwise determined by the MME 32. As discussed below, the priority of the location request may be set by the MME 32 based on any suitable information obtained by the MME 32 that relates to the priority or importance of the location request. This information may include the source of the location request, the cause for the location request, and/or the target(s) of the location request. In addition, a predefined rule(s) may also be considered, where these predefined rules further consider other parameters (e.g., time of day, network load conditions, etc.) when setting the priority of the location request.

In some embodiments, the indication of the priority of the location request is included in a Paging Priority IE of the S1AP Paging Request. As an example, in some embodiments, if the location request is originated from an emergency service (e.g., the police or any other lawful intercept authority), then the Paging Priority IE of the S1AP Paging Request message is set to PrioLevel1 to thereby indicate a highest priority. The Paging Priority IE and corresponding values that can be set in the Paging Priority IE are defined in 3GPP TS 36.413 Release 12; V12.3.0 as provided in Table 1 below.

TABLE 1

| IE/Group Name | Presence | Range | IE Type and Reference | Semantics Description |
|---|---|---|---|---|
| Paging Priority | M | | ENUMERATED (PrioLevel1, PrioLevel2, | Lower value codepoint indicates |

TABLE 1-continued

| IE/Group Name | Presence | Range | IE Type and Reference | Semantics Description |
|---|---|---|---|---|
| | | | PrioLevel3, PrioLevel4, PrioLevel5, PrioLevel6, PrioLevel7, PrioLevel8, . . .) | higher priority. |

Thus, if the location request is a high priority paging request, then the Paging Priority IE is set to PrioLevel1. Otherwise, if the location request is a normal priority location request (e.g., originating from a normal subscriber or non-emergency service), then the Paging Priority IE is set to some value other than PrioLevel1.

Upon receiving the S1AP Paging Request, the RAN 12, and in particular the base station 16, performs congestion control based on the priority of the location request (step 304). As discussed below in detail, when performing congestion control, the base station 16 determines whether the location request is a high priority location request. If not, normal congestion control is performed (e.g., the location request is denied or fails if there is congestion). However, if the location request is a high priority location request, then the RAN 12, and in particular the base station 16, processes the S1AP Paging Request by taking action(s) that allow the location request. For example, the base station 16 may drop other call(s) (e.g., normal priority call(s)) to free up resources for the high priority location request. As another example, the base station 16 may have resources reserved for emergency calls and use these reserved resources for the high priority location request. In this manner, in contrast to the current standards, high priority location requests will be allowed even for target UEs in congested cells.

In this example, it is assumed that the location request is a high priority location request. As such, the RAN 12, and in particular the base station 16, sends an RRC paging request to the target UE 18 (step 306). In response, the UE 18 sends an RRC Connection Request to the RAN 12, and in particular to the base station 16 (step 308). The RAN 12, and in particular the base station 16, then sends an RRC Connection Setup message to the UE 18 (step 310), and the UE 18 responds with an RRC Connection Setup Complete message (step 312). From this point, the process proceeds as described above with respect to the MT-LR procedure of FIG. 3.

Figure 5:
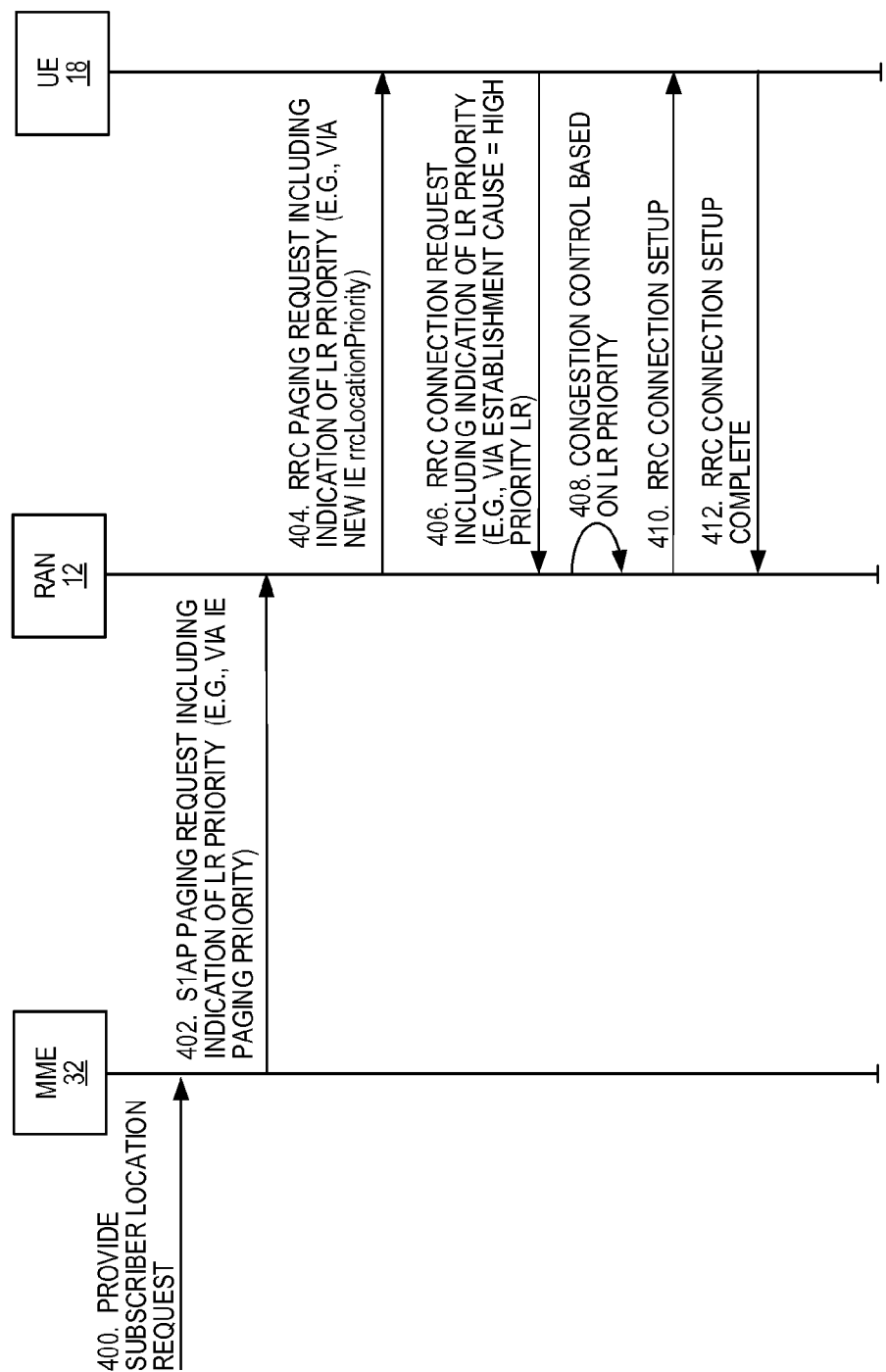
FIG. 5 illustrates the operation of the cellular communications system of FIG. 1 in which an indication of the priority of a MT-LR is utilized for congestion control by the RAN according to some other embodiments of the present disclosure.

FIG. 5 illustrates the operation of the cellular communications system 10 of FIG. 1 in which an indication of the priority of a location request is utilized for congestion control by the RAN 12 according to some other embodiments of the present disclosure. In this embodiment, the location request is a MT-LR, and the UE 18 is in the IDLE mode. As illustrated, the MME 32 receives a Provide Subscriber Location message (step 400). Again, this step corresponds to step 204 in the MT-LR procedure of FIG. 3. The MME 32 then sends an S1AP Paging Request including an indication of the priority of an associated location request to the RAN 12 (specifically to the base station 16) (step 402). Steps 400 and 402 correspond to steps 300 and 302 of FIG. 4 and, as such, the details surrounding these steps are not repeated. However, it should be noted that all of the details discussed above surrounding steps 300 and 302 are equally applicable to steps 400 and 402.

Upon receiving the S1AP Paging Request, the RAN 12, and in particular the base station 16, sends an RRC paging request including an indication of the priority of the location request to the target UE 18 (step 404). More specifically, the base station 16 translates the S1AP Paging Request including the indication of the priority of the location request into the RRC paging request including the indication of the priority of the location request. In some embodiments, the indication of the priority of the location request is included in the RRC paging request as a new IE rrcLocation Priority. In particular, the current version of 3GPP TS 36.331 (Version 12.3.0) defines the contents of the RRC paging request as:

```
Paging ::= SEQUENCE {
    pagingRecordList        PagingRecordList        OPTIONAL, -- Need ON
    systemInfoModification  ENUMERATED {true}       OPTIONAL, -- Need ON
    etws-Indication         ENUMERATED {true}       OPTIONAL, -- Need ON
    nonCriticalExtension    Paging-v890-IEs         OPTIONAL, -- Need OP
}
```

The new IE rrcLocationPriority is added as new content for the RRC paging request.

In some embodiments, the indication of the priority of the location request is coded as 1 bit. For example, if the S1AP Paging Request from the MME 32 to the base station 16 indicates that the priority of the location request is high (e.g., coming from the police), then the new field/IE rrcLocationPriority value is set to 1; otherwise, it is set to 0.

At the UE 18, the RRC paging request is received by the UE 18. If the RRC paging request includes an indication that the priority of the location request is normal (not high), then the process proceeds as normal. However, if the indication of the priority of the location request included in the RRC paging request indicates that the location request is a high priority location request (e.g., if the rrcLocationPriority is set to 1), then the normal RRC connection establishment/setup procedure is triggered with the exception that the procedure is given a high priority (e.g., priority over a normal established call at the RRC protocol level or, in other words, at the eNB level). In this example, this is done by the UE 18 sending an RRC Connection Request to the base station 16 of the RAN 12, where the RRC Connection Request includes an indication of the priority of the location request (step 406). In some embodiments, the indication of the priority of the location request included in the RRC Connection Request is provided via an Establishment Cause included in the RRC Connection Request. For example, for a high priority location request, the Establishment Cause is set to "high priority location request" or some other predefined value that indicates that the cause for the establishment of the RRC connection is a high priority location request.

Specifically, as defined in 3GPP TS 36.331, the RRC Connection Request includes an Establishment Cause IE as follows:

```
RRCConnectionRequest-r8-IEs ::= SEQUENCE {
    ue-Identity          InitialUE-Identity,
    establishmentCause   EstablishmentCause,
    spare                BIT STRING (SIZE (1) )
}
```

In the current standards, the Establishment Cause in the RRC Connection Request can take any value listed in the ENUMERATED field:

```
EstablishmentCause ::= ENUMERATED {
    emergency, highPriorityAccess, mt-Access, mo-Signaling, mo-
    Data, delayTolerantAccess-v1020, spare2, spare1
    establishmentCause
    spare}
```

In some embodiments, a new Establishment Cause is added and is denoted "high priority location request" or some other value that indicates that a high priority request is the cause of the RRC Connection Request. This new Establishment Cause may have a similar priority level as an emergency call. In particular, this new Establishment Cause preferably has the advantage, in at least some occasions (e.g., in the case of congestion), of releasing a normal established voice or packet call or using resources reserved for emergency calls in order to establish the new location request procedure.

In response to receiving the RRC Connection Request from the UE 18, the base station 16 of the RAN 12 performs congestion control based on the priority assigned to the location request (step 408). As discussed below in detail, when performing congestion control, the base station 16 determines whether the location request is a high priority location request based on, in some examples, the Establishment Cause included in the RRC Connection Request. If the priority of the location request is not high (e.g., normal), normal congestion control is performed (e.g., the location request is denied or fails if there is congestion). However, if the location request is a high priority location request, then the RAN 12, and in particular the base station 16, processes the RRC Connection Request by taking action(s) that allow the location request. For example, the base station 16 may drop other call(s) (e.g., normal priority call(s)) to free up resources for the high priority location request. The choice of which call(s) to drop may be performed in any suitable manner (e.g., drop the call with the worst radio condition, drop the call with the most distant UE, etc.). As another example, the base station 16 may have resources reserved for emergency calls (e.g., 5% of resources may be reserved for emergency calls) and use these reserved resources for the high priority location request. In this manner, in contrast to the current standards, high priority location requests will be allowed even for target UEs in congested cells.

In this example, it is assumed that the location request is a high priority location request. As such, the RAN 12, and in particular the base station 16, sends an RRC Connection Setup message to the target UE 18 (step 410). In response, the UE 18 sends an RRC Connection Setup Complete message to the RAN 12, and in particular to the base station 16 (step 412). From this point, the process proceeds as described above with respect to the MT-LR procedure of FIG. 3.

Figure 6:
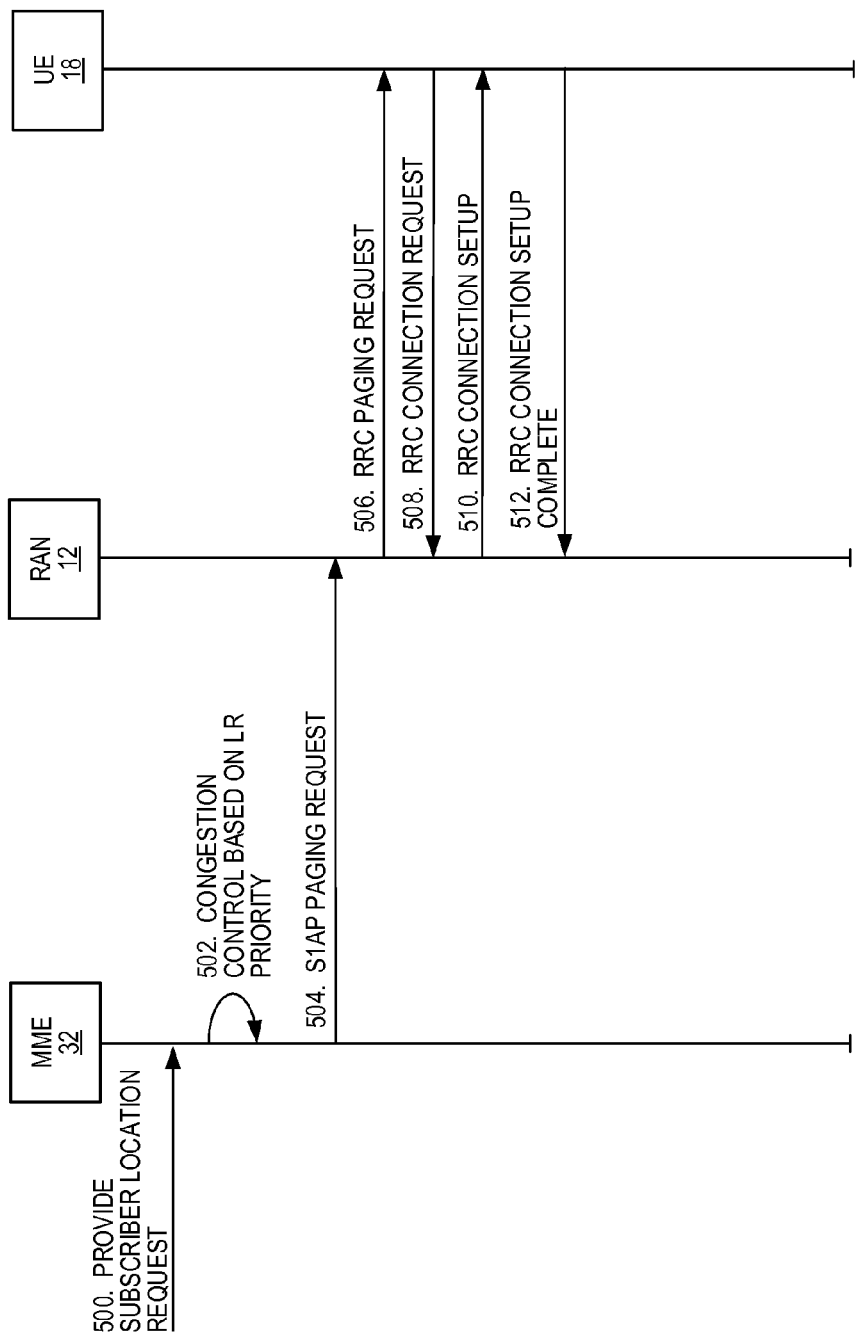
FIG. 6 illustrates the operation of the cellular communications system of FIG. 1 in which an indication of the priority of a MT-LR is utilized for congestion control by the core network according to some embodiments of the present disclosure.

In FIGS. 4 and 5, congestion control is performed in the RAN 12 (e.g., at the base station 16). However, the present disclosure is not limited thereto. In this regard, FIG. 6 illustrates the operation of the cellular communications system 10 of FIG. 1 in which an indication of the priority of a location request is utilized for congestion control by a core network node, which in this example is the MME 32, according to some other embodiments of the present disclosure. In this embodiment, the location request is a MT-LR, and the UE 18 is in the IDLE mode. As illustrated, the MME 32 receives a Provide Subscriber Location message (step 500). Again, this step corresponds to step 204 in the MT-LR procedure of FIG. 3. The MME 32 then performs congestion control based on a priority assigned to the associated location request (step 502). In some embodiments, the priority of the location request is set, or assigned, by another network node (e.g., the GMLC 22) and provided to the MME 32 (e.g., in the Provide Subscriber Location message). In other embodiments, the priority is assigned to the location request by the MME 32 (e.g., based on information such as, for example, source, cause, target(s), etc.).

As discussed below, when performing congestion control, the MME 32 denies or rejects the location request (e.g., terminate the location request procedure) if there is congestion at the MME 32 (e.g., congestion related to the cell of the target UE 18) and the location request is not a high priority location request. However, if the location request is a high priority location request, then the MME 32 takes an appropriate action(s) to accept or allow the location request even though there is congestion (e.g., drop normal call(s) or use reserved resources).

In this example, the location request is a high priority location request and, as such, the MME 32 allows the location request. As such, the MME 32 sends an S1AP Paging Request to the RAN 12 (specifically to the base station 16) for the target UE 18 (step 504). The procedure then proceeds in the normal manner to establish an RRC connection between the base station 16 and the target UE 18. In particular, upon receiving the S1AP Paging Request, the RAN 12, and in particular the base station 16, sends an RRC Paging Request to the target UE 18 (step 506). In response, the sends an RRC Connection Request to the base station 16 of the RAN 12 (step 508). In response to receiving the RRC Connection Request from the UE 18, the base station 16 sends an RRC Connection Setup message to the target UE 18 (step 510). In response, the UE 18 sends an RRC Connection Setup Complete message to the RAN 12, and in particular to the base station 16 (step 512). From this point, the process proceeds as described above with respect to the MT-LR procedure of FIG. 3.

Figure 7:
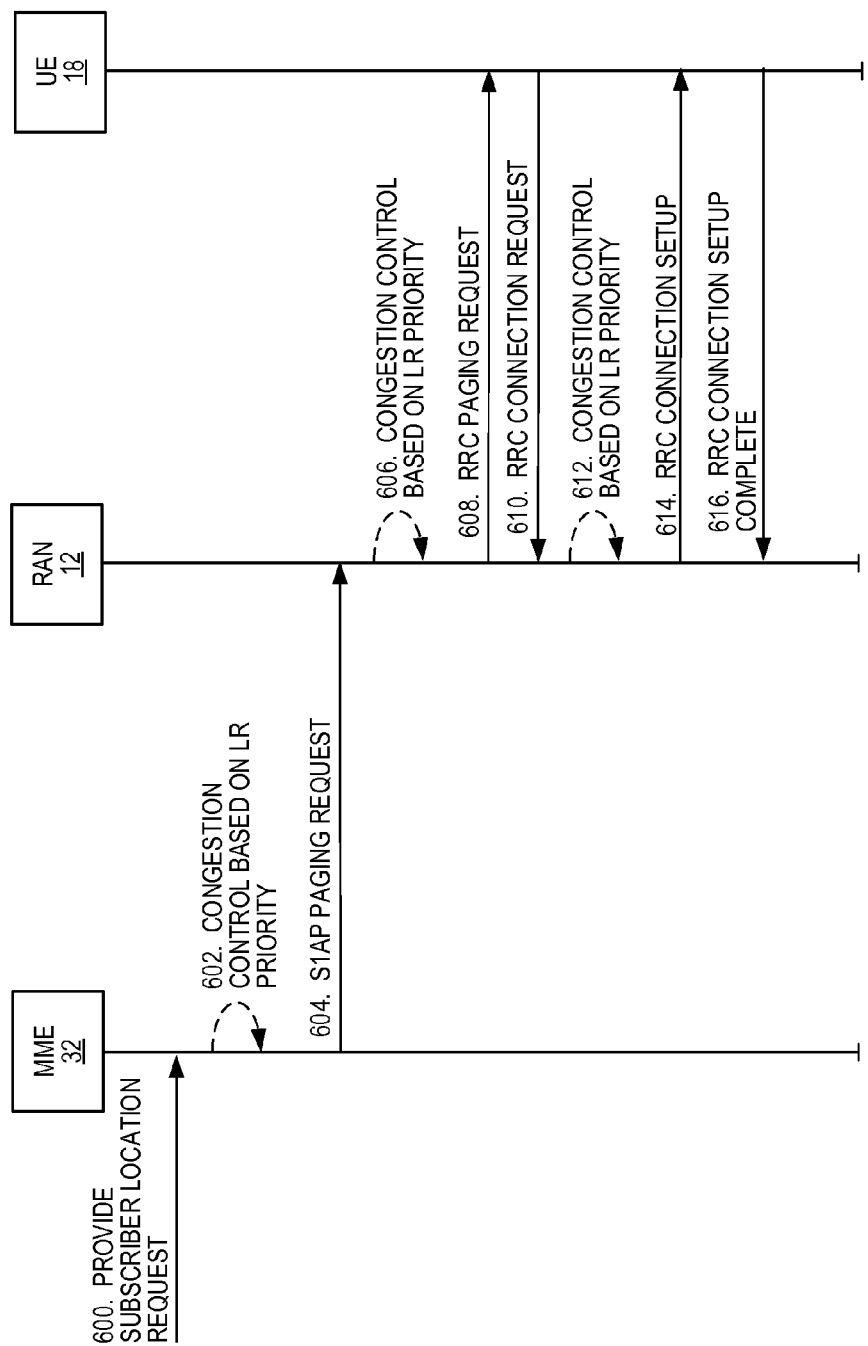
FIG. 7 illustrates the operation of the cellular communications system of FIG. 1 in which an indication of the priority of a MT-LR is utilized for congestion control by the RAN and/or the core network according to some embodiments of the present disclosure.

FIGS. 4 through 6 illustrate embodiments in which congestion control is performed at the base station 16 prior to paging the UE 18, performed at the base station 16 during RRC connection setup, and performed by the MME 32 prior to paging the UE 18, respectively. FIG. 7 illustrates the operation of the cellular communications system 10 in which congestion control is performed at the base station 16 prior to paging the UE 18, performed at the base station 16 during RRC connection setup, and/or performed by the MME 32 prior to paging the UE 16. In other words, FIG. 7 illustrates that the embodiments of FIGS. 4 through 6 can be combined to perform multiple layers of congestion control if desired.

As illustrated, the MME 32 receives a Provide Subscriber Location message (step 600). Again, this step corresponds to step 204 of the MT-LR procedure of FIG. 3. Optionally, the MME 32 performs congestion control based on the priority assigned to the associated location request, as discussed above with respect to FIG. 6 (step 602). Assuming that, if congestion control is performed by the MME 32, the location request is a high priority request, then the MME 32 sends an S1AP Paging Request to the RAN 12 (specifically to the base station 16) (step 604). Optionally, upon receiving the S1AP Paging Request, the RAN 12, and in particular the base station 16, performs congestion control based on the priority of the location request, as discussed above with respect to FIG. 4 (step 606).

In this example, it is assumed that the location request is a high priority location request. As such, if the base station 16 performs the congestion control of step 606, the base station 16 decides to allow the location request. As such, the RAN 12, and in particular the base station 16, sends an RRC paging request to the target UE 18 (step 608). In response, the UE 18 sends an RRC Connection Request to the RAN 12, and in particular to the base station 16 (step 610). Optionally, the base station 16 performs congestion control based on the priority of the location request in response to the RRC Connection Request from the target UE 18, as described above with respect to FIG. 5 (step 612). Assuming, if congestion control is performed, that the base station 16 decides to allow the location request, the RAN 12, and in particular the base station 16, then sends an RRC Connection Setup message to the UE 18 (step 614), and the UE 18 responds with an RRC Connection Setup Complete message (step 616). From this point, the process proceeds as described above with respect to the MT-LR procedure of FIG. 3. The process of FIG. 7 may enable, for example, the MME 32 to perform congestion control at the MME/core network level while the base station 16 performs congestion control at the RAN/base station level.

Figure 8:
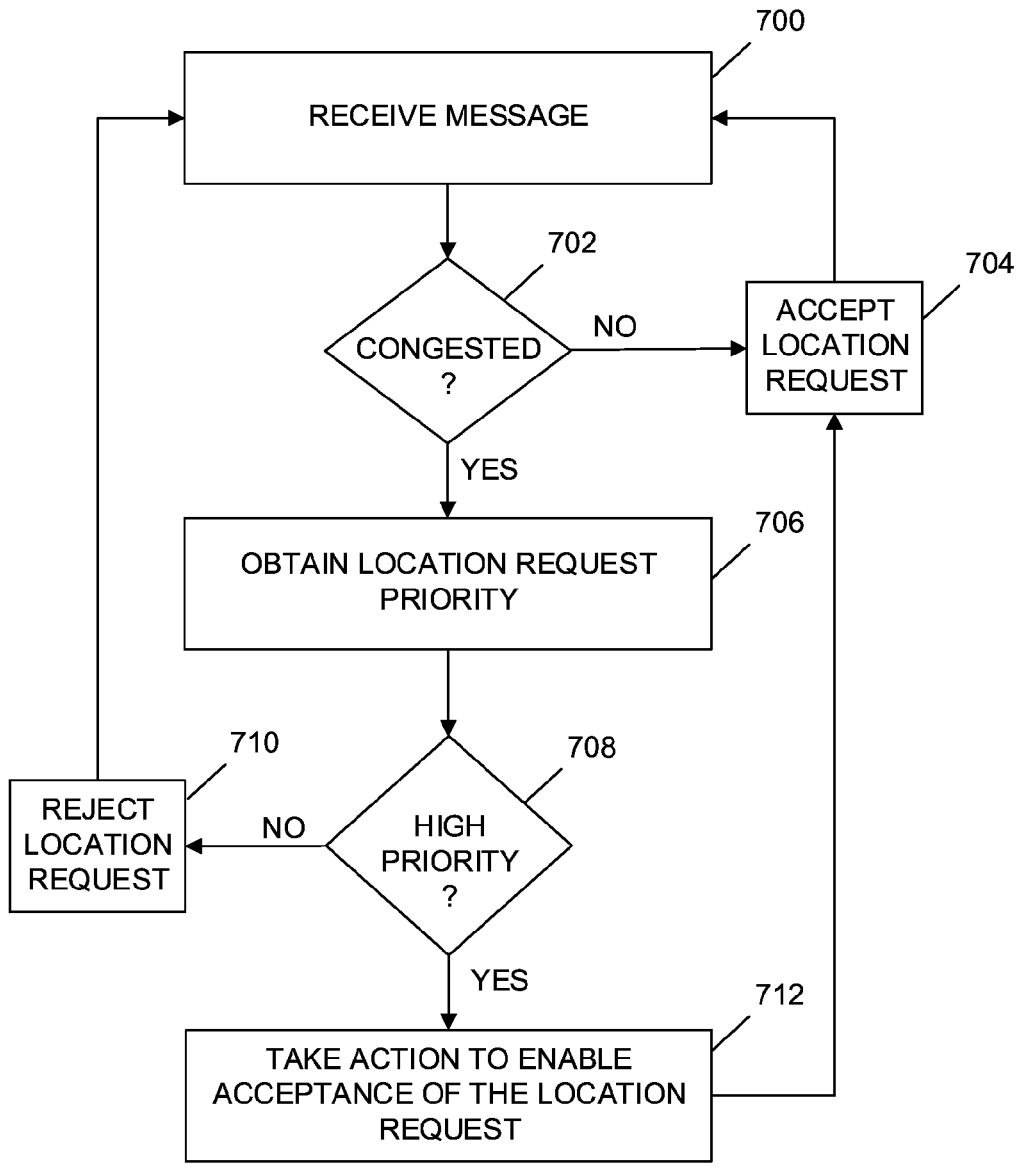
FIG. 8 is a flow chart that illustrates a congestion control procedure according to some embodiments of the present disclosure.

FIG. 8 is a flow chart that illustrates a congestion control procedure according to some embodiments of the present disclosure. This procedure is only an example. As discussed above, the congestion control procedure may vary depending on the particular implementation. The congestion control procedure is performed by the network node (e.g., the MME 32 or the base station 16) performing congestion control. As illustrated, the network node first receives a message associated with a location request (step 700). As discussed above, in some examples, the message is an S1AP Location Request Reporting Control message received by the MME 32. In other examples, the message is an S1AP Paging Request or an RRC Connection Request received by the base station 16.

The network node determines whether there is congestion (step 702). This congestion may be, for example, congestion at the corresponding protocol level (e.g., congestion in the core network 14 if congestion control is being performed by the MME 32 or congestion in the RAN 12 if congestion control is being performed by the base station 16). As another example, the congestion may be congestion in the cell in which the target UE 18 is located, as determined by the network node. If there is no congestion, then the location request is accepted (step 704) such that the location request procedure proceeds in the normal manner. However, if there is congestion, the network node obtains the priority of the location request (step 706). The priority of the location request may be provided to the network node, e.g., in the received message, as discussed above. The network node then determines whether the location request is a high priority location request (step 708). If not, the network node rejects the location request by, e.g., terminating the location request procedure (step 710). However, if the location request is a high priority location request, then the network node takes an action(s) to enable acceptance of the location request, as described above (step 712) and then accepts the location request (step 704) by, e.g., continuing with the location request procedure.

Figure 9:
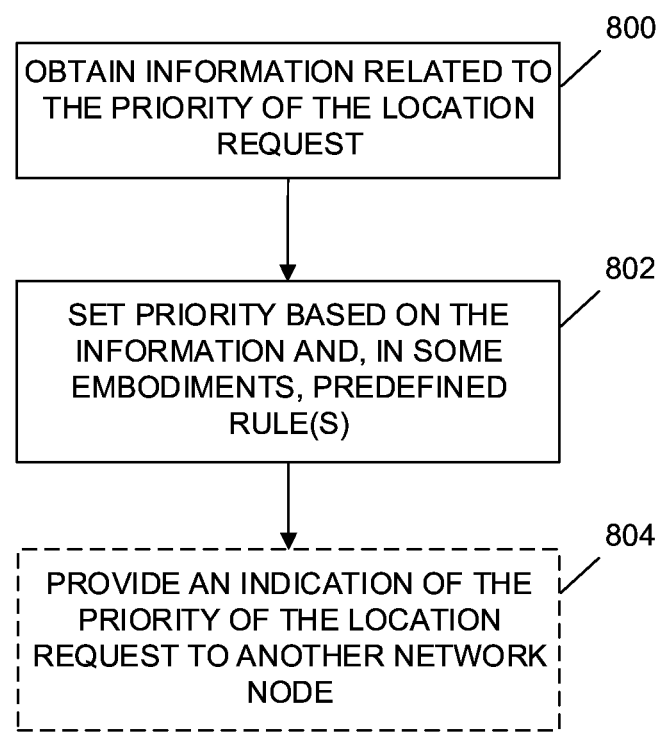
FIG. 9 illustrates a process for setting a priority of, or assigning a priority to, a location request according to some embodiments of the present disclosure.

FIG. 9 illustrates a process for setting a priority of, or assigning a priority to, a location request according to some embodiments of the present disclosure. This process may be performed by any suitable network node (e.g., the GMLC 22, the MME 32, or the base station 16). As illustrated, the network node obtains information related to the priority or importance of the location request (step 800). This information may include, for example, information that indicates a source of the location request (e.g., the police), a cause of the location request (e.g., a lawful intercept), and/or a target(s) of the location request (e.g., the UE 18). The network node then sets a priority of the location request, or assigns a priority to the location request, based on the information and, in some embodiments, one or more predefined rules (step 802). More specifically, in some embodiments, the priority of the location request is static, e.g., always high priority if the source of the location request is an emergency service provider (e.g., the police). In other embodiments, the priority of the location request is dynamic or semi-dynamic, e.g., determined as a function of both the information related to the importance of the location request and the predefined rule(s). The predefined rules may be based on, e.g., network load conditions, time of day, day of week, and/or the like. For instance, the priority assigned to a location request from a particular source may vary depending on network load conditions and/or time.

Once the priority is set, in some embodiments, the network node uses the priority locally. For example, if the network node is the MME 32 or the base station 16, the network node may use the priority for congestion control as described with respect to the embodiments above. In other embodiments, the network node provides an indication of the priority of the location request to another network node (step 804). For example, if the network node is the MME 32, the MME 32 may then include the indication of the priority of the location request in an S1AP Paging Request sent to the base station 16, as described with respect to some of the embodiments above. As another example, if the network node is the GMLC 22, the GMLC 22 may then include the indication of the priority of the location request in a Provide Subscriber Location message sent to the MME 32. As yet another example, if the network node is the base station 16, the base station 16 may then include the indication of the priority of the location request in an RRC paging request message sent to the target UE 18.

Figure 10:
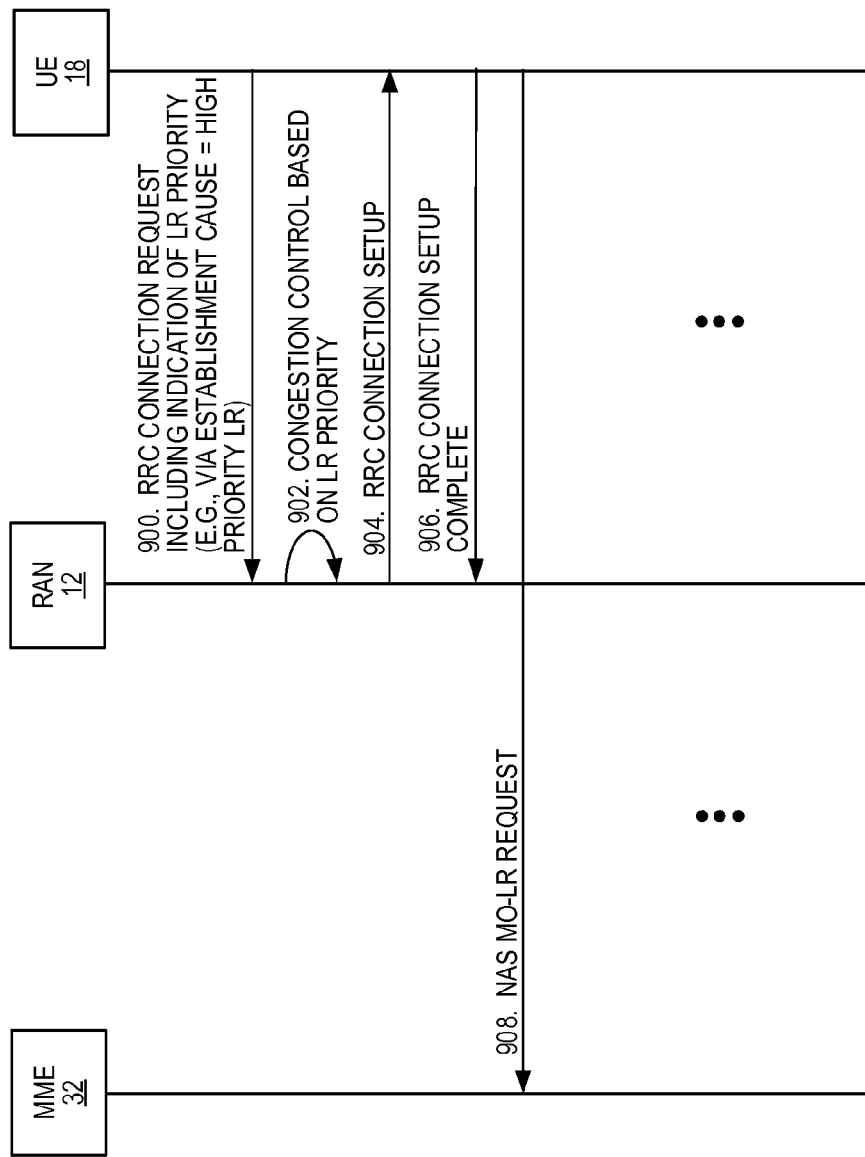
FIG. 10 illustrates the operation of the cellular communications system of FIG. 1 in which an indication of the priority of a MO-LR is utilized for congestion control by the RAN according to some other embodiments of the present disclosure.

Thus far, the discussion has focused on mobile terminating location requests. However, the concepts disclosed herein are also applicable to mobile originating location requests. In this regard, FIG. 10 illustrates the operation of the cellular communications system 10 of FIG. 1 in which an indication of the priority of a location request is utilized for congestion control by the RAN 12 according to some other embodiments of the present disclosure. In this embodiment, the location request is a MO-LR. The MO-LR request may be triggered in some occasions with a high priority. For example, if the UE 18 is being tracked by the police, the UE 18 has to report its location whenever the UE 18 is switched on/off. In another scenario, there is a periodic location request for the UE 18, where the UE 18 is in IDLE mode. The first location request is conveyed in a paging message; however, all other subsequent location requests are mobile originated where the UE 18 reports its location every interval of some defined time, T. In such cases, each time the UE 18 triggers a MO-LR, the procedure of FIG. 10 is followed.

As illustrated, in order to initiate RRC establishment for the MO-LR, the UE 18 sends an RRC Connection Request to the base station 16 of the RAN 12, where the RRC Connection Request includes an indication of the priority of the location request (step 900). In some embodiments, the indication of the priority of the location request included in the RRC Connection Request is provided via an Establishment Cause included in the RRC Connection Request, as discussed above. In response to receiving the RRC Connection Request from the UE 18, the base station 16 of the RAN 12 performs congestion control based on the priority assigned to the location request as indicated by the indication included in the RRC Connection Request (step 902).

As discussed above, when performing congestion control, the base station 16 determines whether the location request is a high priority location request based on, in some examples, the Establishment Cause included in the RRC Connection Request. If the priority of the location request is not high (e.g., normal), normal congestion control is performed (e.g., the location request is denied or fails if there is congestion). However, if the location request is a high priority location request, then the RAN 12, and in particular the base station 16, processes the RRC Connection Request by taking action(s) that allow the location request. For example, the base station 16 may drop other call(s) (e.g., normal priority call(s)) to free up resources for the high priority location request. The choice of which call(s) to drop may be performed in any suitable manner (e.g., drop the call with the worst radio condition, drop the call with the most distant UE, etc.). As another example, the base station 16 may have resources reserved for emergency calls (e.g., 5% of resources may be reserved for emergency calls) and use these reserved resources for the high priority location request. In this manner, in contrast to the current standards, high priority location requests will be allowed even for target UEs in congested cells.

In this example, it is assumed that the location request is a high priority location request. As such, the RAN 12, and in particular the base station 16, sends an RRC Connection Setup message to the target UE 18 (step 904). In response, the UE 18 sends an RRC Connection Setup Complete message to the RAN 12, and in particular to the base station 16 (step 906). The UE 18 then sends a NAS MO-LR Request message to the MME 32 via the RAN 12 (step 908). Step 908 corresponds to step 102 of the MO-LR procedure of FIG. 2. From this point, the process proceeds as described above with respect to the MO-LR procedure of FIG. 2.

Figure 11:
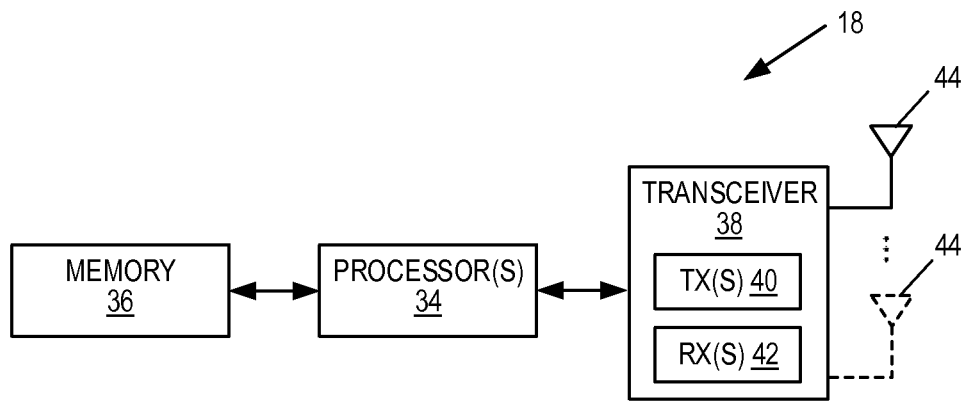
FIG. 11 is a block diagram of the User Equipment (UE) of FIG. 1 according to some embodiments of the present disclosure.

FIG. 11 is a block diagram of the UE 18 according to some embodiments of the present disclosure. As illustrated, the UE 18 includes one or more processors 34 (e.g., Central Processing Unit(s) (CPU(s)), Application Specific Integrated Circuit(s) (ASIC(s)), Field Programmable Gate Array(s) (FPGA(s))), memory 36, and a transceiver 38 including one or more transmitters 40 and one or more receivers 42 coupled to one or more antennas 44. In some embodiments, the functionality of the UE 18 described herein is implemented in software stored in the memory 36, where the software is executed by the processor(s) 34 such that the UE 18 operates according to any of the embodiments described herein.

In some embodiments, a computer program including instructions which, when executed by at least one processor, causes the at least one processor to carry out the functionality of the UE 18 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 36).

Figure 12:
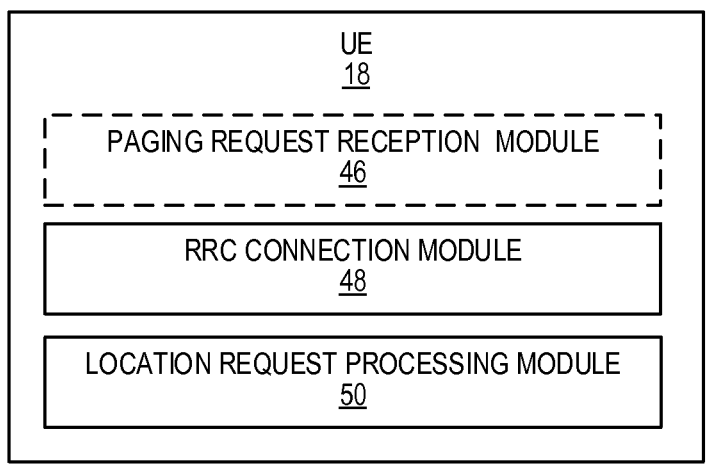
FIG. 12 is a block diagram of the UE of FIG. 1 according to some other embodiments of the present disclosure.

FIG. 12 is a block diagram of the UE 18 according to some other embodiments of the present disclosure. As illustrated, the UE 18 includes a paging request reception module 46 (in some embodiments), an RRC connection module 48, and a location request processing module 50, each of which is implemented in software. In some embodiments, the paging request reception module 46 operates to receive (via an associated receiver 42 of the UE 18) an RRC paging request from the base station 12, where the paging request may include an indication of the priority of an associated location request. The RRC connection module 48 operates to send and receive (via associated transmitter(s) 40 and receiver(s) 42 of the UE 18) RRC messages for RRC connection establishment. In some embodiments, the RRC connection module 48 sends (via an associated transmitter 40 of the UE 18) an RRC Connection Request including an indication of the priority of an associated location request. Lastly, the location request processing module 48 operates to provide any processing necessary for either MT-LRs or MO-LRs (e.g., originates/triggers MO-LRs in some embodiments).

Figure 13:
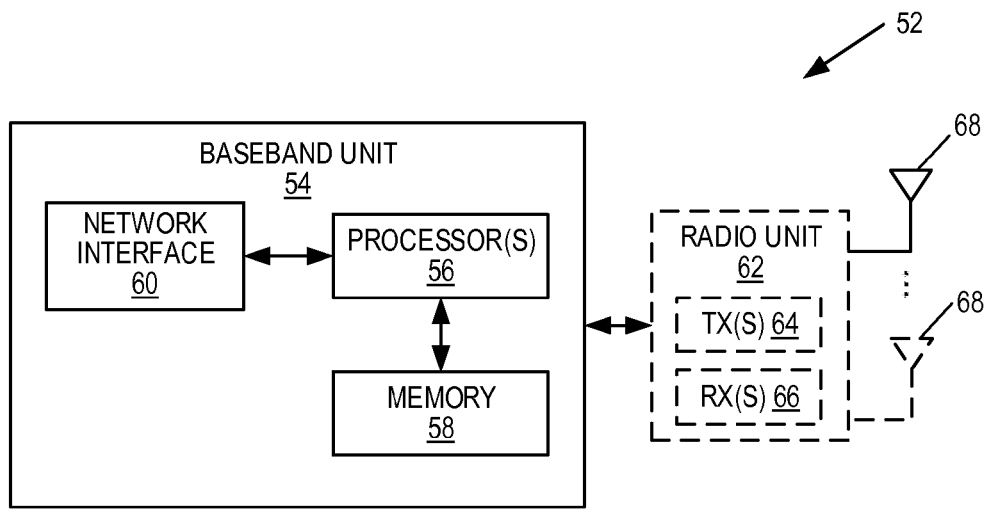
FIG. 13 is a block diagram of a network node in the cellular communications system of FIG. 1 according to some embodiments of the present disclosure.

FIG. 13 is a block diagram of a network node 52 according to some embodiments of the present disclosure. The network node 52 may be either a core network node (e.g., the GMLC 22 or the MME 32) or a radio access node (e.g., the base station 16). As illustrated, the network node 52 includes a baseband unit 54 including one or more processors 56 (e.g., CPU(s), ASIC(s), and/or FPGA(s)), memory 58, and a network interface 60. If the network node 52 is a radio access node (e.g., the base station 16), the network node 52 also includes a radio unit 62 including one or more transmitters 64 and one or more receivers 66 coupled to one or more antennas 68. In some embodiments, the functionality of the network node 52 (e.g., the functionality of the GMLC 22, the MME 32, or the base station 16) is implemented in software and stored in the memory 58 for execution by the processor(s) 56.

In some embodiments, a computer program including instructions which, when executed by at least one processor, causes the at least one processor to carry out the functionality of the network node 52 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 58).

Figure 14:
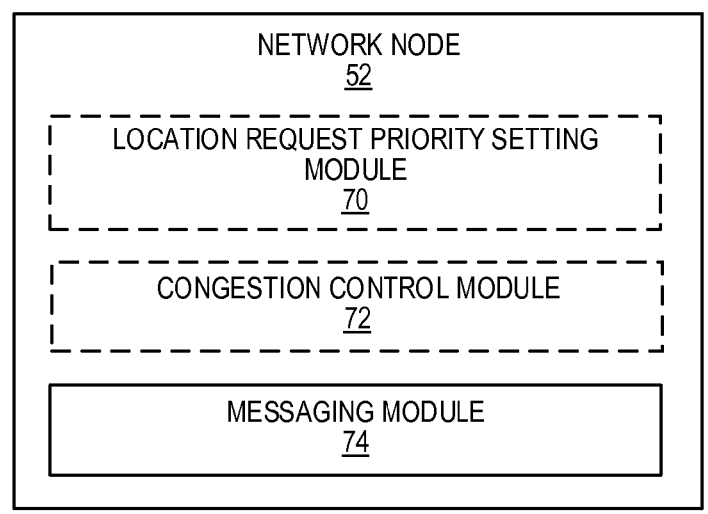
FIG. 14 is a block diagram of a network node in the cellular communications system of FIG. 1 according to some other embodiments of the present disclosure.

FIG. 14 is a block diagram of the network node 52 according to some other embodiments of the present disclosure. Again, the network node 52 may be either a core network node (e.g., the GMLC 22 or the MME 32) or a radio access node (e.g., the base station 16). As illustrated, the network node 52 includes a location request priority setting module 70 (in some embodiments), a congestion control module 72 (in some embodiments), and a messaging module 74, each of which is implemented in software. The location request priority setting module 70 operates to set the priority of a location request, as described above. The congestion control module 72 operates to perform congestion control based on location request priority, as discussed above. The messaging module 74 operates to send and/or receive messages (via an associated network interface of the network node 52 and/or via an associated transmitter(s) and receiver(s) of the network node 52 depending on the particular type of network node) from other nodes (e.g., other network nodes or the target UE 18) according to any of the embodiments described above.

The following acronyms are used throughout this disclosure.

3GPP $3^{rd}$ Generation Partnership Project
5G $5^{th}$ Generation
ASIC Application Specific Integrated Circuit
CPU Central Processing Unit
CS Circuit Switched
eNB Enhanced or Evolved Node B
EPC Evolved Packet Core
EPS Evolved Packet System
E-SMLC Enhanced Serving Mobile Location Center
E-UTRAN Evolved Universal Terrestrial Radio Access Network
FPGA Field Programmable Gate Array
GMLC Gateway Mobile Location Center
GSM Global System for Mobile Communications
H-GMLC Home Gateway Mobile Location Center
HLR Home Location Register
HSS Home Subscriber Server
IE Information Element
IP Internet Protocol
LCS Location Services
LTE Long Term Evolution
MME Mobility Management Entity
MO-LR Mobile Originating Location Request
MT-LR Mobile Terminating Location Request
NAS Non-Access Stratum
NB Node B
PLMN Public Land Mobile Network
PS Packet Switched
RAN Radio Access Network
RANAP Radio Access Network Application Part
RNC Radio Network Controller
RRC Radio Resource Control
RRH Remote Radio Head
S1AP S1 Application Protocol
TS Technical Specification
UE User Equipment
UMTS Universal Mobile Telecommunications System
UTRA Universal Mobile Telecommunications System Terrestrial Radio Access
V-GMLC Visiting Gateway Mobile Location Center
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications system to process a message related to a location request, comprising:
   receiving a message related to a location request comprising an indication of a priority assigned to the location request; and
   performing congestion control with respect to the message related to the location request, either prior to or during setup of a radio connection between a radio access network of the cellular communications system and a target wireless device of the location request, based on the priority assigned to the location request.

2. The method of claim 1, wherein the network node is a radio access node in the radio access network, and the message is a paging request related to the location request.

3. The method of claim 2 wherein the paging request is a S1 Application Protocol, S1AP, paging request, and the indication of the priority assigned to the location request comprised in the S1AP paging request is comprised in a paging priority information element of the S1AP paging request.

4. The method of claim 2 wherein performing congestion control comprises performing congestion control with respect to the paging request based on the indication of the priority assigned to the location request comprised in the paging request.

5. The method of claim 1 wherein the network node is a radio access node in the radio access network, and the message is a connection request from the target wireless device of the location request.

6. The method of claim 5 wherein the connection request comprises the indication of the priority assigned to the location request.

7. The method of claim 6 wherein the connection request is a Radio Resource Control, RRC, Connection Request, and the indication of the priority assigned to the location request is provided by an Establishment Cause comprised in the RRC Connection Request.

8. The method of claim 7 wherein the Establishment Cause is set to a value that is indicative of a high priority location request if the priority assigned to the location request is a high priority.

9. The method of claim 6 wherein performing congestion control comprises performing congestion control with respect to the connection request based on the indication of the priority assigned to the location request comprised in the connection request.

10. The method of claim 6 further comprising, prior to receiving the connection request, sending a paging request to the target wireless device including the indication of the priority assigned to the location request.

11. The method of claim 10 wherein the paging request is a Radio Resource Control, RRC, paging request and the indication of the priority assigned to the location request is comprised in an information element in the RRC paging request that is dedicated to providing an indication of location request priority.

12. The method of claim 11 wherein the connection request is an RRC Connection Request, and the RRC Connection Request comprises an Establishment Cause set to an indication of a high priority location request if the indication of the priority assigned to the location request comprised in the information element in the RRC paging request is indicative of the location request being a high priority location request.

13. The method of claim 1, wherein the network node is a core network node in a core network of the cellular communications system, and the message is a location request reporting control message.

14. The method of claim 13 wherein the location request reporting control message comprises the indication of the priority assigned to the location request.

15. The method of claim 1 wherein performing congestion control with respect to the message related to the location request comprises:
   determining whether the network node is congested;
   if the network node is congested, determining whether the location request is a high priority location request; and
   if the location request is a high priority location request, taking an action to enable acceptance of the location request.

16. The method of claim 1 further comprising receiving the indication of the priority assigned to the location request from another network node.

17. The method of claim 1 further comprising determining the priority assigned to the location request.

18. The method of claim 1 further comprising:
   obtaining information related to the priority assigned to the location request; and
   setting the priority assigned to the location requested based on the information.

19. The method of claim 18 wherein the information related to the priority assigned to the location request comprises at least one of a group consisting of: a source of the location request, one or more targets of the location request, and a cause of the location request.

20. The method of claim 18 wherein setting the priority comprises dynamically setting the priority assigned to the location request based on the information and one or more predefined rules.

21. A network node in a cellular communications system enabled to process a message related to a location request, comprising:
   an interface;
   at least one processor; and
   memory containing software executable by the at least one processor whereby the network node is configured to:
     receive a message related to a location request via the interface; and
     perform congestion control with respect to the message related to the location request, either prior to or during setup of a radio connection between a radio access network of the cellular communications system and a target wireless device of the location request, based on a priority assigned to the location request.

* * * * *